United States Patent [19]

Rosen

[11] Patent Number: 4,853,852

[45] Date of Patent: Aug. 1, 1989

[54] MEANS FOR MARKETING

[75] Inventor: Nathan C. Rosen, Mystic, Conn.

[73] Assignee: Combined Information Technologies, Inc., Mystic, Conn.

[21] Appl. No.: 213,678

[22] Filed: Jun. 30, 1988

Related U.S. Application Data

[63] Continuation of Ser. No. 825,528, Feb. 3, 1986, abandoned.

[51] Int. Cl.$^4$ .............................................. G06F 15/21
[52] U.S. Cl. ...................................... 364/401; 364/402
[58] Field of Search ............... 364/401, 402, 408, 444; 235/384, 385; 379/93, 100, 112, 135

[56]  References Cited

U.S. PATENT DOCUMENTS

| | | | |
|---|---|---|---|
| 4,115,870 | 9/1978 | Lowell | 364/900 |
| 4,345,147 | 8/1982 | Aaron et al. | 235/385 |
| 4,397,542 | 8/1983 | Brodesser | 355/77 x |
| 4,417,322 | 11/1983 | Berry et al. | 364/900 |
| 4,437,085 | 3/1984 | Salant | 364/444 X |
| 4,525,624 | 6/1985 | Pontefract | 364/189 X |
| 4,604,696 | 8/1986 | Suganuma et al. | 364/401 |
| 4,734,858 | 3/1988 | Schlafly | 235/380 X |

Primary Examiner—Jerry Smith
Assistant Examiner—Steven G. Kibby
Attorney, Agent, or Firm—Stoll, Previto & Hoffman

[57]  ABSTRACT

A marketing tool having portable lap computer for recording a sales call made by a salesman of an employer on a customer. The information of the call is transmitted from the lap computer to a master computer and at the end of the day, the master computer prepared a letter to the customer acknowledging the sales call. The acknowledgement letter is sent on the letterhead of the employer and in the color of the letterhead logo. The master computer automatically prepares a daily planner or planning aid chart as well as a customer call activity chart and a territory penetration chart which include maps of the territories involved.

2 Claims, 5 Drawing Sheets

MEANS FOR MARKETING

RELATED APPLICATION

This application is a continuation of pending U.S. patent application Ser. No. 825,528 filed Feb. 3, 1986 and now abandoned.

The present invention relates to an improved management and marketing tool and, more particularly, to an improved management and marketing system adapted to enable a sales organization to monitor its sales activities with respect to its customers and potential customers in a pre-determined area.

BACKGROUND

The number of computers being installed and used has been increasing steadily and will continue to increase over the years affecting virtually every segment of society. However, use of computers by sales persons as management and marketing tools has not been growing as fast as it has in other fields. Presently, computer use in sales has been confined to "order-filling" activities as opposed to "order-getting" activities. The productivity of a sales force represents one of the more costly and critical aspects of a sales operation. It is estimated that 70% of business telephone calls are not completed on the first attempt resulting in telephone lag between sales personnel and the home office. Valuable information is lost because paperwork and reporting is viewed as a burden by sales people. Furthermore, sales management does not have or take the time to thoroughly evaluate sales reports.

In addition, many companies are not large enough to make the necessary customer follow-ups nor are they large enough to have the necessary summaries of their salesperson's activities at their fingertips so that often many promising sales leads do not culminate in sales. Moreover, many companies do not, or cannot, take the time and/or use the personnel necessary to thank each customer called upon and many salespersons do not have the time or the facilities to do this important customer relations function.

BRIEF DESCRIPTION

The present invention overcomes these difficulties and provides an improved marketing tool which permits a new level of sales productivity by computerizing the sales force.

Another object of the present invention is the provision of an improved marketing tool which includes a network of portable lap computers that combine data collection and telecommunications with sales information database.

Another object of the present invention is the provision of an improved marketing tool which creates a coordinated sales environment that will increase the productivity of a sales organization.

Another object of the present invention is the provision of an improved marketing tool in which the master computer automatically sends out periodic reports which will keep the sales organization abreast of the activities of its salespersons vis-a-vis its customers.

Another object of the present invention is the provision of an improved marketing tool to permit the salesperson to automatically record his daily call activities to a master computer.

Another object of the present invention is the provision of an improved marketing tool which will automatically keep contact with the customer shortly after the salesperon has called upon it.

Another object of the present invention is the provision of an improved marketing tool in which the customer called upon receives a acknowledgement of the sales call on the letterhead of the particular sales organization making the call.

Another object of the present invention is the provision of an improved marketing tool in which the master computer may send acknowledgement letters from many sales organizations to keep the individual attention desired by many accounts.

Other and further objects of the invention will be obvious upon an understanding of the illustrative embodiment about to be described, or will be indicated in the appended claims, and various advantages not referred to herein will occur to one skilled in the art upon employment of the invention in practice.

Briefly, a salesperson makes a customer call, and after the visit, customer information is entered into a portable lap computer. At the end of the day, each salesperson connects his portable lap computer to a telephone and sends the day's call information to a master computer at a predetermined location in a central office. At the same time, each salesperson automatically sends any messages and picks up any messages from the central office. After receiving the day's call information, the master computer automatically generates thank-you letters to each customer seen that day. Preferably, these thank-you letters are generated on the letterhead of the saleperson's employer.

Each week, the master computer generates and sends each salesperson and/or his sales manager a map of the sales territories showing where the calls were made geographically, the customers seen, the sales calling efficiency and other relevant call information for that week. Each week, the master computer also prints and sends each salesperson a group-calling map showing the salesperson where the customers are that need to be called upon. The purpose of this map is to enable the salesperson to group calls geograhically. This will increase the number of calls a salesperson makes in a day. At other predetermined intervals, such as quarterly and yearly, there are other maps or graphics generated showing sales penetration and marketing information for the past period. In addition, customer lists and customer profiles may be made from the master computer upon request.

DESCRIPTION OF THE DRAWING

A preferred embodiment of the invention has been chosen for purposes of illustration and description and is shown in the accompanying drawings forming a part of the specification, wherein.

DESCRIPTION OF THE INVENTION

Figure 1:
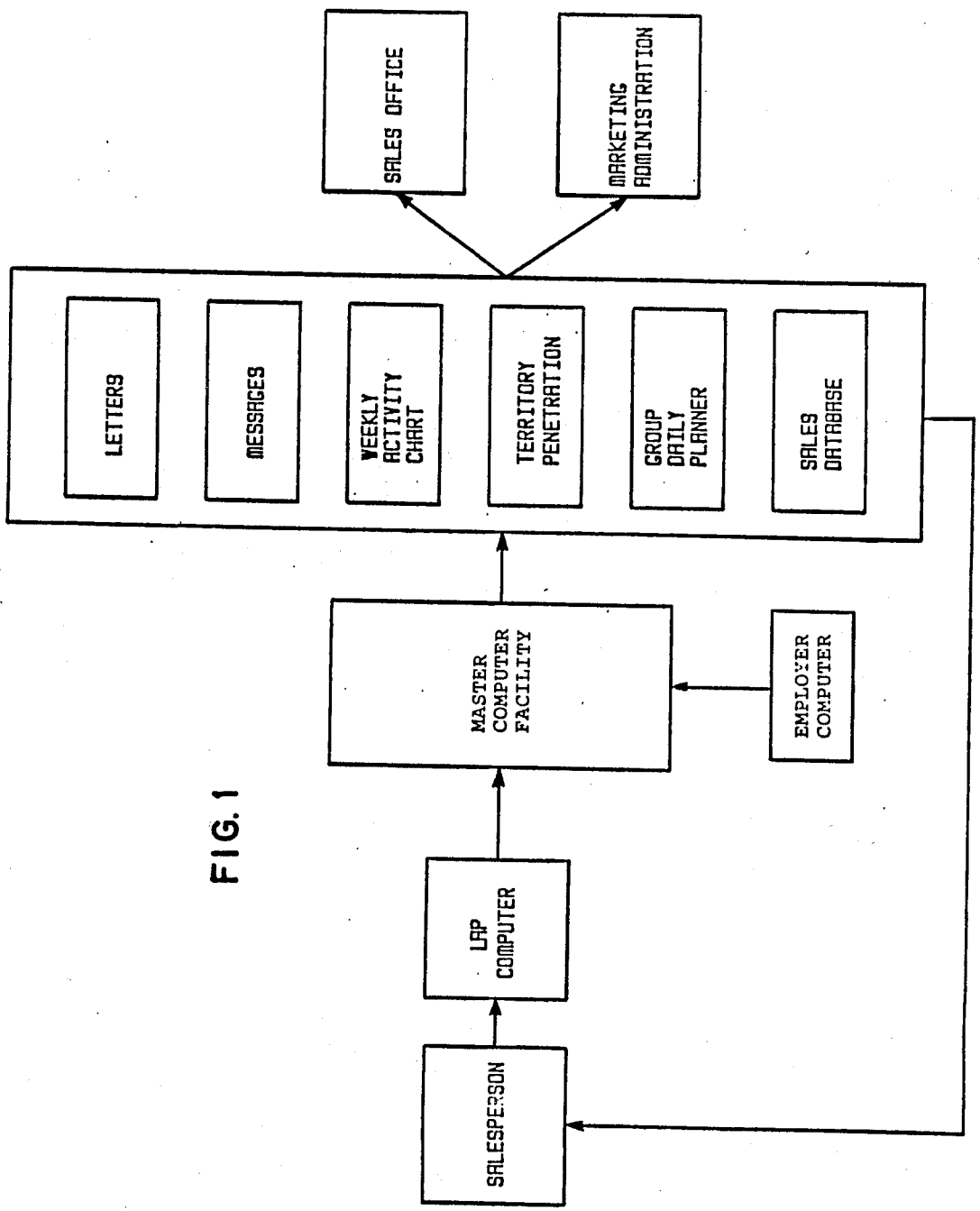
FIG. 1 is a flow diagram showing the operation of the present invention.

Referring to the drawings and more particularly to FIG. 1, each salesperson is quipped with a portable lap computer which is compatible with a master computer located at a central office through a telephone connection. There are a number of such lap computers on the market which may be used for this purpose. From the input from the various lap computers from the various salespersons, there is generated the various functions of the present invention. The materials and computers which are used in connection with this invention are known standard materials and computers which may be purchased on the open market. Programming of said materials and computers can be done by anyone skilled in the art. Hence, the programming and other details of these materials and computers will not be described in detail herein.

Each salesperson makes a customer call and after the visit, customer information is entered into the lap computer. At the end of the day, each salesperson connects his portable lap computer to a telephone and transmits the day's customer call information to the master computer. At the same time, each salesperson automatically relays any messages to the central office and picks up any messages from the central office. After receiving the day's customer call information, the master computer automatically generates thank-you letters to each customer seen. The letters are automatically generated on specialized mailing equipment and letterheads which will be described in greater detail hereinbelow.

Figure 2:
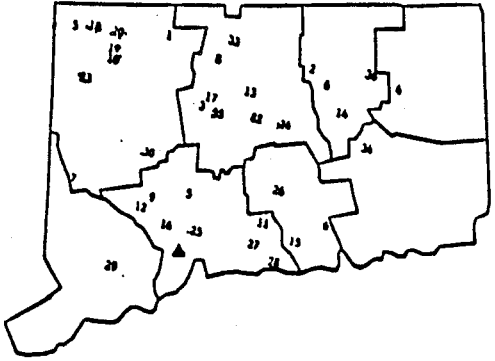
FIG. 2 is an illustration of a daily planner or planning aid printout which is automatically generated in accordance with the present invention.
Figure 3:
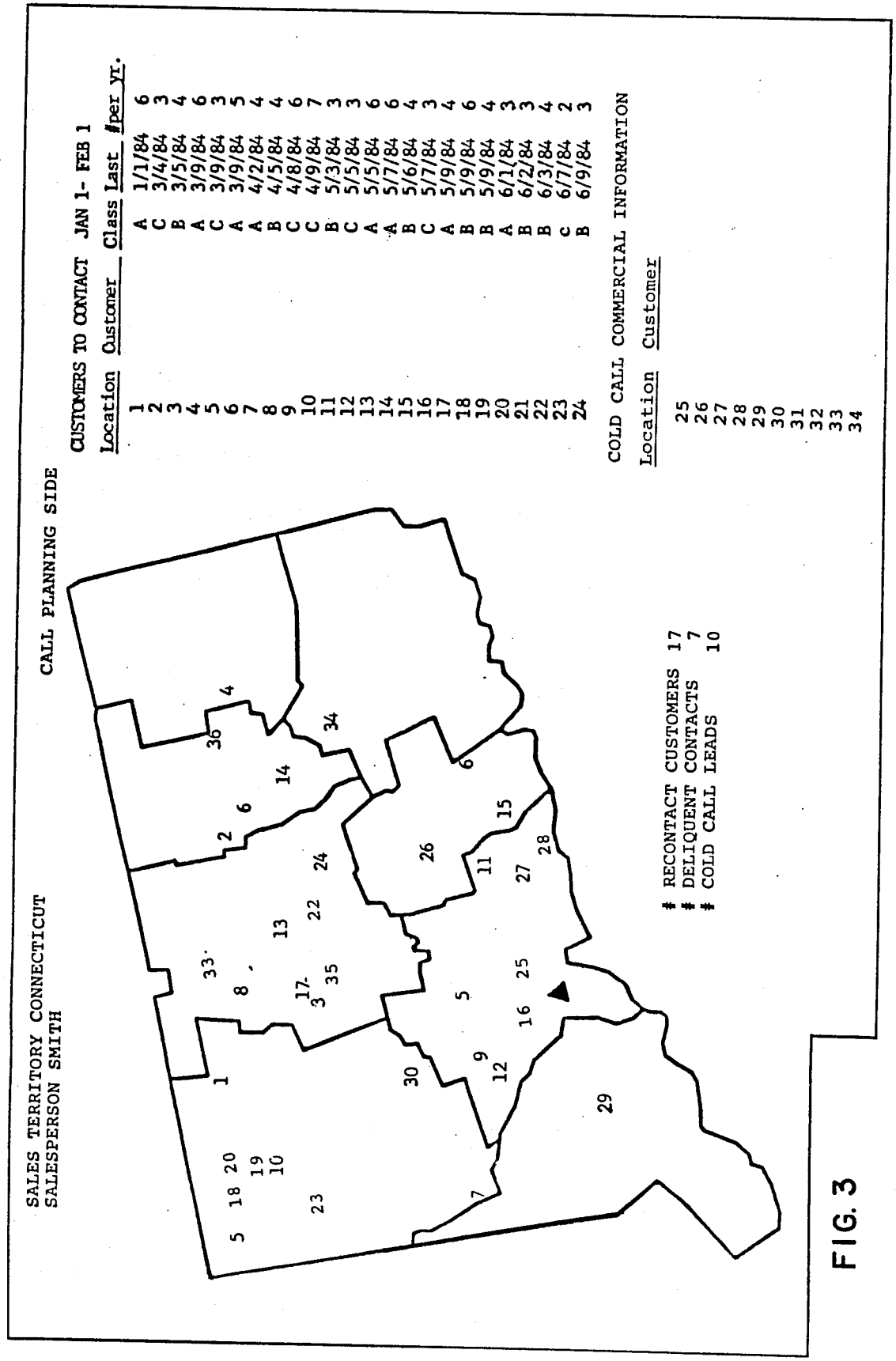
FIG. 3 is an illustration of another type of daily planner or planning aid printout which may also be generated.
Figure 4:
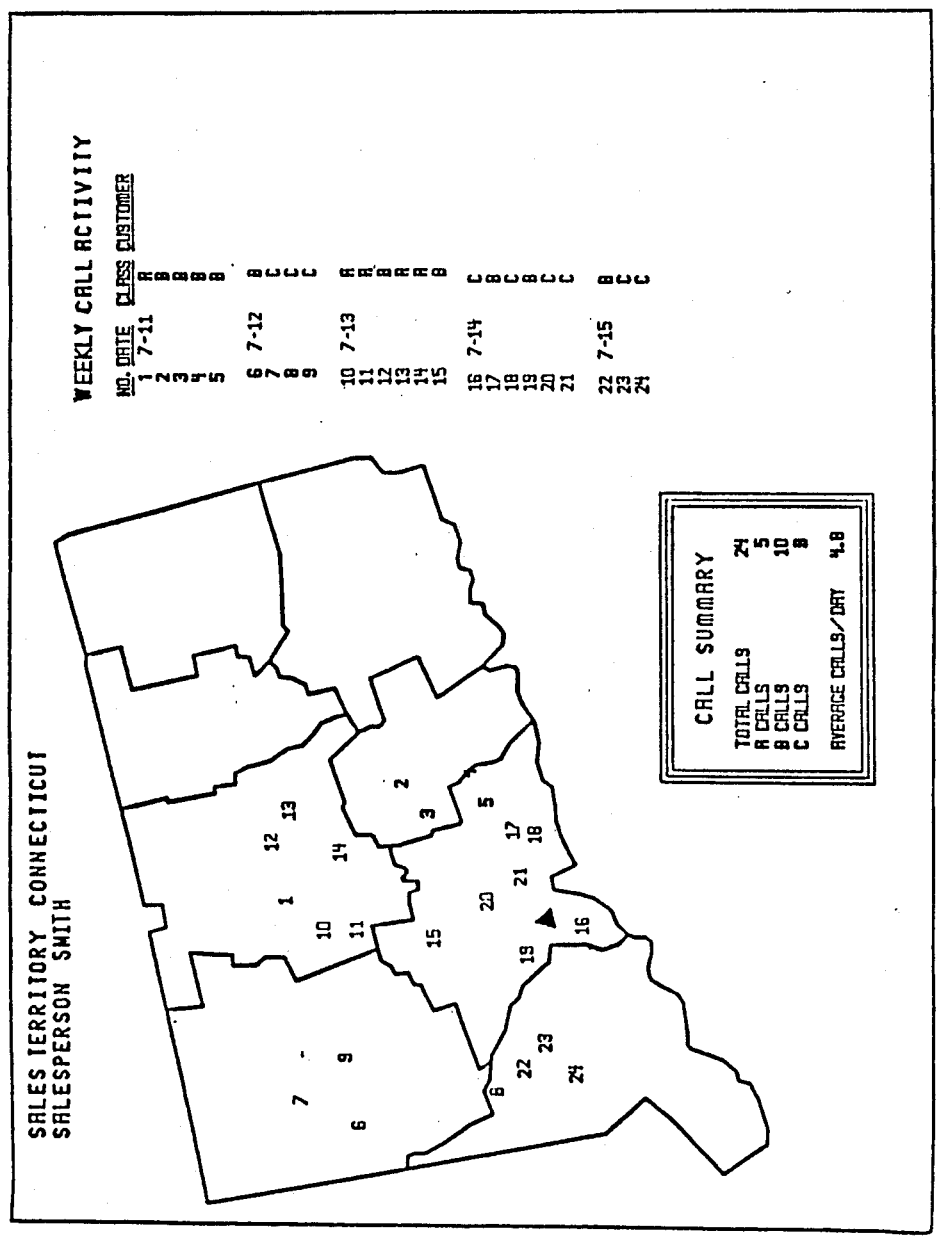
FIG. 4 is an illustration of a printout showing weekly customer call activity.

Each week, the master computer sends each salesperson and his sales manager a map, such as the one shown in FIG. 4, of the sales territories showing where the calls were made geographically, the customers seen, the sales calling efficiency, and other relevant call information for that week. Each week, the master computer prints and sends each salesperson a daily planner or planning aid map, such as the ones shown in FIGS. 2 and 3, showing the salesperson where the customers are that need to be called upon. The purpose of this graphic is to enable the salesperson to group geographic calls and will increase the number of calls a salesperson makes in a day.

Figure 5:
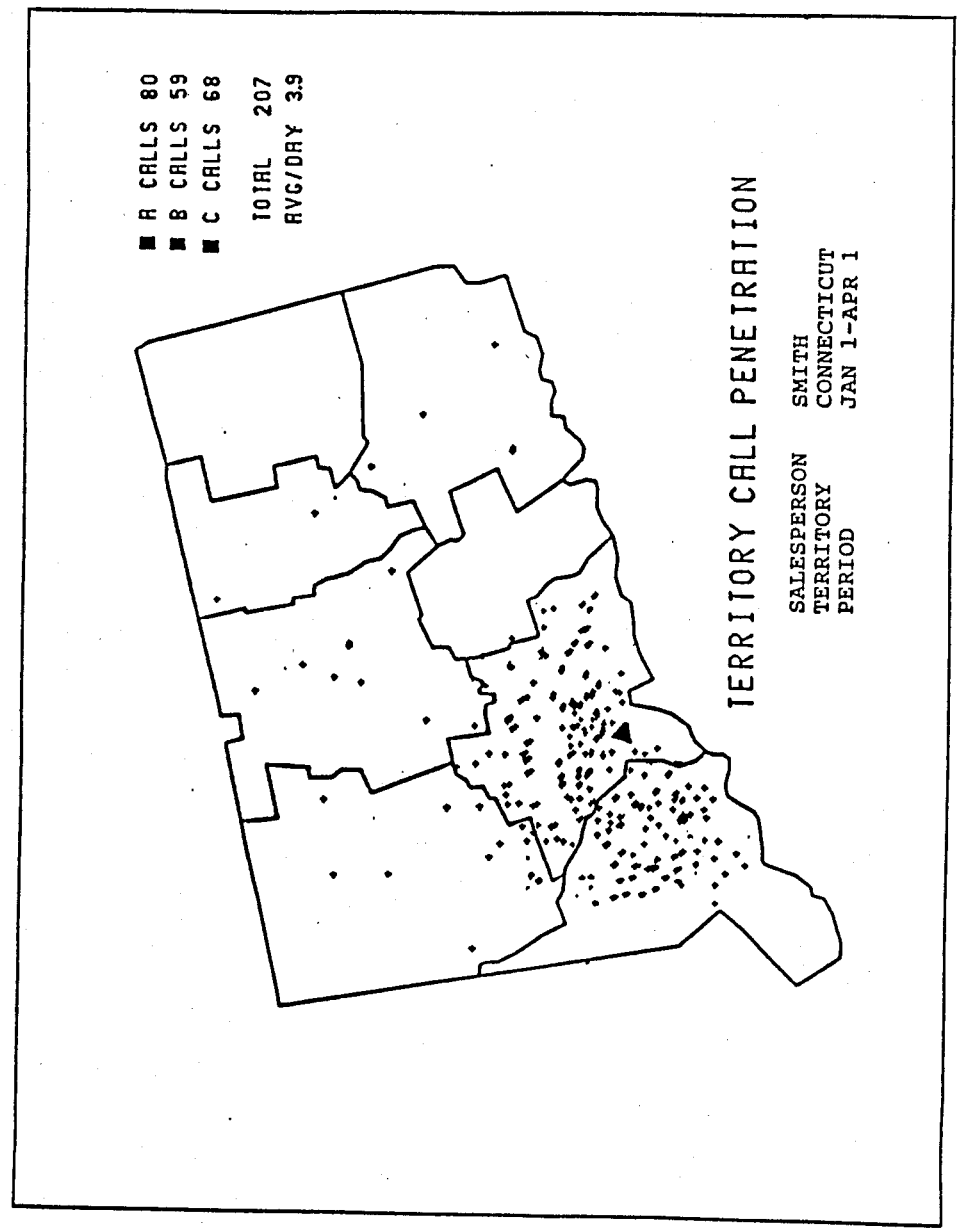
FIG. 5 is an illustration of a printout showing the calls made in a territory in any given period of time.

Quarterly and yearly, other maps, such as the one shown in FIG. 5, are generated by the master computer showing sales penetration and marketing information.

For purposes of illustration, the State of Connecticut has been chosen to demonstrate the invention and is shown in the maps of FIGS. 2 to 5, however, it will be understood that it is within the purview of the present invention that any other geographic area may be used to practice the invention.

FIGS. 2 and 3 show planning aids or daily planners. They indicate to the salesperson where the customers are and will help the salesperson to travel more efficiently and be able to see more customers. The graphics in FIG. 2 include a legend showing the customer's name as well as the person there to contact and the customer's telephone number. Each customer is given a map number, which number appears on the map, showing the location of each customer with respect to the salesperson's employer's office which is shown by the triangle. In addition, groups of customers may be numbered in different colors so that the salesperson knows which customer contacts are overdue and which customer contacts should be done in a particular week. For example, overdue customer contacts may be color-coded in red, both in the legend and on the map, and customer contacts to be made during different weeks may be coded in different colors on the legend as well as on the map. Thus, the salesperson knows at a glance which customers are to be called upon in any particular week.

An alternate graphic is illustrated in FIG. 3 where the customers are again given certain location numbers but where delinquent customers may be illustrated in a color both on the legend and on the map and cold call contacts may be designated in a different color. It will be understood that the maps and grahics shown in FIGS. 2 and 3 may be combined into a single map and legend without departing from the invention.

FIG. 4 illustrates a weekly call activity aid showing the calls a salesperson made during a particular week. It shows where the salesperson made calls geographically, the call planning and the efficiency of the salesperson's calling. In a manner similar to the coding of customers shown in FIGS. 2 and 3, the customers are also given numbers, and those customers who have been called on in the past are divided into different colors, both on the legend and on the map, so that at one glance a salesperson may know which customers were called on in a particular week in a particular area. The graphic also has a summary indicating how many calls were made to different classes of customers.

FIG. 5 shows a map illustrating the calls made in a territory for any given period of time, such as quarterly, and the information is used to determine which areas are being thoroughly covered and which are not, and to direct a salesperson to deficient areas of the territory. This may also be useful for territory re-alignment, hiring new salespeople and establishing new distribution facilities. In this graphic, the number of calls made in an area are grouped by class and are color coded so that a salesperson or his manager knows the concentration of calls in the different parts of a territory according to the classification given to a particular customer.

As indicated above, thank-you letters are generated by the master computer at the end of each day. These letters are sent on the letterhead of the salesperson's employer. The employer supplies the master computer with a copy of its company logo which is digitized and stored in the memory of the master computer. The employer is furnished with software which remains in the employer's computer which is compatible with the master computer and which can automatically send individual letters and common messages together with mailing lists. The master computer recognizes the source of these transmissions and brings forth from its memory the correct digitized logo of the particular employer. The master computer, with appropriate formatting and zip code sorting, drives color printers, preferably four-color printers, which print the employer's letterhead and logo in appropriate colors, return address and address of the recipient. Hence, many employers can send thank-you letters to their respective customers on the letterhead of the employer through the master computer automatically without the employer's using any of its own time or personnel to thereby maintain the personal touch necessary for good customer relations.

The envelope blanks and the personalized letters are printed with a unique bar code which has been assigned by the master computer from its software program to identify a letter and envelope of a particular employer. The printed letters and envelopes are placed into a separate feeding and mailing mechanism, such as the one described in greater detail in pending U.S. application Ser. No. 747,704 filed June 24, 1985, the subject matter of which is now incorporated in U.S. Pat. No. 4,694,631 dated Sept. 22, 1987. the subject matter of which is incorporated herein by reference.

It will thus be seen that the present invention provides an improved marketing tool which permits a new level of sales productivity by computerizing the sales force and utilizing a network of portable lap computers that combine data collection and telecommunications with sales information database in order to create a coordinated sales environment that will increase the productivity of a sales organization. The present invention includes a master computer which automatically sends out periodic reports which will keep the sales organization abreast of the activities of its salespersons vis-a-vis its customers and which permits the salesperson to automatically record his daily call activities to a master computer. The sales organization will be permitted to automatically keep contact with the customer shortly after the salesperson has called upon it and the customer called upon will receive an automatic acknowledgement of the sales call on the letterhead of the particular sales organization making the call. The invention permits a master computer to send acknowledgement letters from many sales organizations to keep the individual attention desired by many accounts.

As many and varied modifications of the subject matter of this invention will become apparent to those skilled in the art from the detailed description given hereinabove, it will be understood that the present invention is limited only as provided in the claims appended thereto.

The embodiments of the invention in which an exclusive property or privilege is claimed are defined as follows:

1. A mechanism for a marketing system comprising portable means for recording data of a visit made by a salesman of an employer on a customer, means for transmitting data of said visit from said portable means to a master processing means, and means responsive to said master processing means to prepare a letter to the customer acknowledging the visit, said master processing means comprising means for periodically automatically preparing a planning chart showing the location where customers are to be visited, said master processing means further comprising means for periodically preparing a customer call activity chart showing the visits a salesman has made, and a territory penetration chart showing the number of visits made in a territory, means for sending said acknowledgment letter on the letterhead of said employer, said responsive means having a mechanism for receiving information and data from an employer's computer means concerning the employer's stationery logo and means for automatically directing reproduction of the logo on the acknowledgment letter.

2. A mechanism as set forth in claim 1 wherein said charts include maps of the territories involved and have color-coded numbers for customer identification and classification.

* * * * *